US006206623B1

(12) United States Patent
Podd

(10) Patent No.: US 6,206,623 B1
(45) Date of Patent: Mar. 27, 2001

(54) BULKHEAD FOR RETAINING A CARGO IN A CONTAINER

(76) Inventor: Stephen D. Podd, 1321 Sherbrooke West, Apt. E-1, Montreal, PQ (CA), H3G 1J4

( * ) Notice: Subject to any disclaimer, the term of this patent is extended or adjusted under 35 U.S.C. 154(b) by 0 days.

(21) Appl. No.: 08/577,045

(22) Filed: Dec. 22, 1995

(51) Int. Cl.[7] .................................................. B60P 7/14
(52) U.S. Cl. .......................... 410/130; 410/129; 410/132; 410/142; 220/1.5
(58) Field of Search .................................. 410/129, 130, 410/132, 141, 142; 220/1.5, 540–542, 544, 545; 296/24.1

(56) References Cited

U.S. PATENT DOCUMENTS

| 2,063,434 | 12/1936 | Hersey et al. ................... 410/142 |
| 2,546,929 | 3/1951 | Nampa ............................. 410/147 |
| 2,565,997 | 8/1951 | Stone .............................. 410/129 |
| 2,725,827 | * 12/1955 | Wehby ............................ 410/130 |
| 2,766,704 | 10/1956 | McMahon ........................ 410/151 |
| 2,895,431 | * 7/1959 | Ford ................................ 410/129 |
| 3,427,997 | 2/1969 | Brown, Jr. et al. .............. 410/119 |
| 3,438,149 | * 4/1969 | Ilg .................................. 410/130 |
| 3,712,663 | 1/1973 | Laven .............................. 296/24 |
| 3,868,042 | 2/1975 | Bodenheimer ................ 220/63 R |
| 3,980,196 | 9/1976 | Paulyson et al. ................ 220/1.5 |
| 4,080,906 | * 3/1978 | Brown .......................... 296/24.1 X |
| 4,124,136 | 11/1978 | Bjelland et al. ................... 220/68 |
| 4,396,325 | * 8/1983 | Joice-Cavanagh ............... 410/129 |
| 4,436,466 | 3/1984 | Marino ........................... 410/118 |
| 4,498,824 | 2/1985 | Kinkle ............................ 410/121 |
| 4,556,349 | 12/1985 | Koudstaal ....................... 410/140 |
| 4,784,287 | 11/1988 | Yamada .......................... 220/403 |
| 4,799,607 | 1/1989 | Podd ................................ 222/94 |
| 4,842,459 | 6/1989 | Jensen et al. .................... 410/97 |
| 4,880,342 | 11/1989 | Pradovic ........................ 410/121 |
| 4,986,706 | * 1/1991 | William Jr. ..................... 410/129 |
| 5,244,332 | 9/1993 | Krein et al. ..................... 414/267 |
| 5,318,193 | 6/1994 | Podd et al. ...................... 220/1.5 |
| 5,595,315 | * 1/1997 | Podd et al. .................... 220/1.5 X |

FOREIGN PATENT DOCUMENTS 2226300   6/1990   (GB).
2228468   9/1990   (GB).

* cited by examiner

Primary Examiner—Stephen T. Gordon
(74) Attorney, Agent, or Firm—John C. Smith

(57) ABSTRACT

A bulkhead for use with cargo containers that carry dry flowable cargo. The bulkhead has flaps on the bottom edge and on both side edges. When the bulkhead is installed in a container, the flap on the bottom folds against the floor of the container to form a seal. The side flaps also fold against the sides of the container to form seals. The seals prevent the dry flowable cargo, when loaded in the container, from leaking out of the container. This eliminates the need for a liner in the container to hold the cargo.

24 Claims, 18 Drawing Sheets

Prior Art

Figure 5
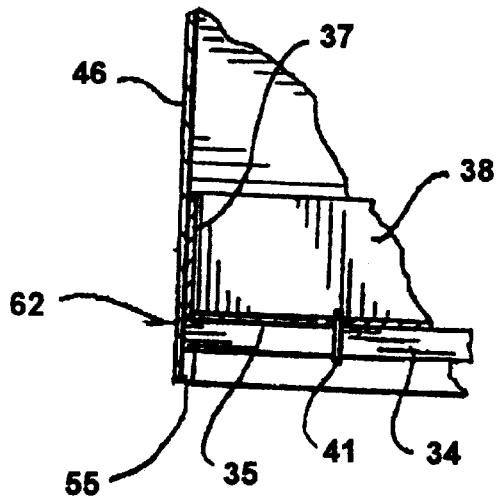
Figure 6
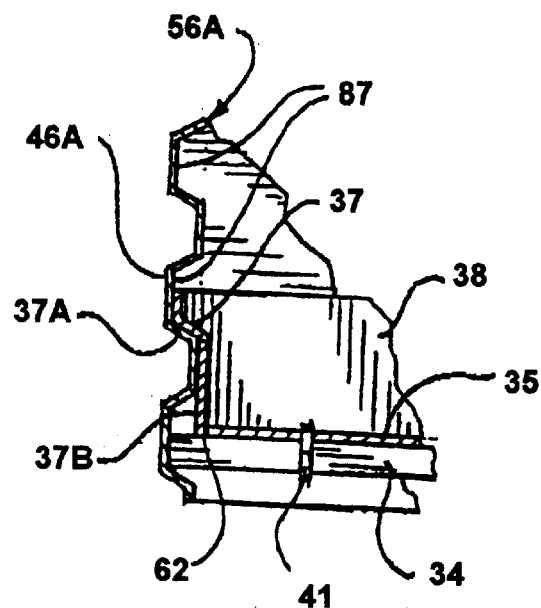
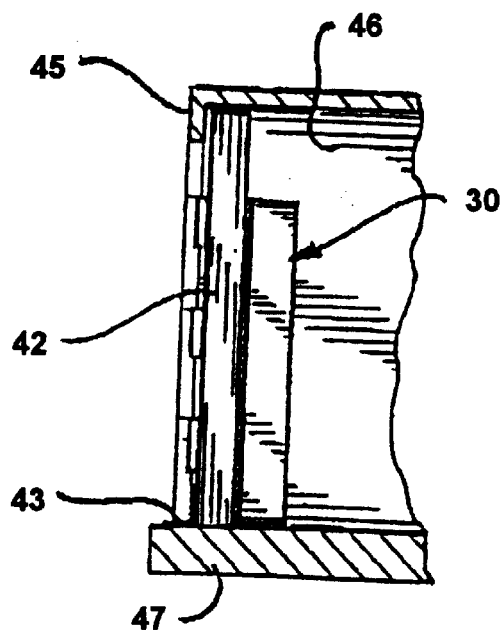
Figure 7

BULKHEAD FOR RETAINING A CARGO IN A CONTAINER

BACKGROUND OF THE INVENTION

1. Field of the Invention

This invention relates in general to dry bulk cargo containers, and in particular to a method or apparatus for closing off the rear end of such a container. More specifically, it relates to providing a partially sealing closure for the rear of a container.

2. Background Art

Use of standard-type ISO cargo containers has come into widespread use in the shipping industry in the last thirty to forty years. Dry bulk, flowable cargos make up one class of cargo shipped in these containers. Use of the container to transport a dry bulk, flowable cargo of up to 44,000 pounds avoids the necessity of having to package small amounts, fifty pounds to one ton, of the cargo in separate packaging, and then place them in the container. The dry bulk cargo is generally blown into or deposited in the container by a gravity feed system.

A number of methods exist for enclosing and sealing the cargo in the container for transport. One involves using a large plastic liner in the container to contain and protect the dry bulk, flowable cargo; U.S. Pat. No. 3,868,042 describes one commonly used method and apparatus. The shipping industry also uses bulkheads of various designs and materials to help support liners and retain cargo in a container. U.S. Pat. No. 4,799,607 provides one example of such a bulkhead which has enjoyed widespread acceptance.

A number of shipping applications do not require the use of such liners because of cost or lack of need. In such situations, the dry bulk cargo can simply be placed in the container by appropriate means and shipped. However, one must still close off the rear of the container while the container doors are open to appropriately contain the cargo and seal it in the container until it arrives at its destination. Cargos quite often shipped by such method without a liner include hops, beans or other raw food commodities before processing, as well as recycled plastic, polyethylene or polypropylene in a pelletized or powder form.

In order to appropriately contain the product in the container and prevent it from spilling out of the rear of the container, a bulkhead is placed across the rear or at some position in the container to create the appropriate cargo space between the bulkhead and front wall of the container.

The preferred current method used in the industry involves placing a rectangular sheet of plywood at the rear of the container, which sheet fits generally snugly with respect to the side walls and floor of the container. FIG. 1 depicts such a bulkhead 25 placed at the rear of a container 21. Doors 22, 23 are shown in the open position. Generally, bracing, consisting of 2×4's or other type of wooden or metal bars 24, is placed behind the bulkhead 25, if necessary, to secure it and support it in an upright position in the container. However, with this method, gaps tend to exist at the edges of the plywood bulkhead, namely gaps 29 along the edges of the bulkhead 25 which abut the walls, and gap 26 at the bottom of the bulkhead 25. The cargo or product being shipped will often leak out through these gaps. In order to avoid this, after installation of the bulkhead 25 with bracing 24, a worker has to climb over the top of the bulkhead through the gap 19 between the ceiling of the container and the top of the bulkhead. The worker then, once inside the container, has to brush, spray, or by some other means apply an adhesive to the area covered by plastic sheets 199 and 27. After applying the adhesive to these areas, he then has to press on the sheet of plastic 26 as depicted along the floor, and the sheet of plastic 27 as depicted between the bulkhead and wall. These plastic sheets, when properly placed, then create an appropriate seal to prevent loss of product through gaps 28 and 29. However, this method can prove expensive, given the extra work required. Additionally, it can prove a dangerous method in that, while climbing in or out, the worker could accidently fall or trip and perhaps injure himself/herself. Also, these plywood bulkheads are heavy and clumsy, and are expensive to manufacture. Also, they must be re-used a number of times to recoup their full value.

Another problem with the current art bulkhead as depicted in FIGS. 1 and 2 is the fact that, during loading of many dry bulk, flowable cargos, dust generated by the loading process vents through the opening created by the gap 19 between the top of the bulkhead 25 and the ceiling 21 of the container.

SUMMARY OF THE INVENTION

The purpose of the invention herein is to resolve the problems noted above, and to provide a bulkhead that can be quickly and easily installed.

The invention described herein provides an apparatus and method for closing off the rear opening of a container and for automatically providing a seal for the seam between the bulkhead and walls and floor of the container. This allows for the transport of dry bulk, flowable commodities without the necessity of enclosing the same in a liner.

It is a further object of the invention to provide a prefabricated, inexpensive, easily installable bulkhead to accomplish the objects of the inventions.

In brief, the invention provides a moveable, semi-rigid bulkhead for retaining cargo inside a cargo container. These ISO containers generally have a floor, left and right side walls, as well as a front wall and a rear opening. The bulkhead itself has a central wall member adapted to rest on the floor of the container in a close fit with the floor and side walls of the container. The center wall is a thin, flexible, semi-rigid, substantially planar sheet which has only a first and a second side. It also generally has a rectangular shape defined by four edges. The construction of the bulkhead is such that it has a lower edge adapted to rest on the floor of the container, and a right edge adapted to rest against the right side wall, and a left edge adapted to rest against the left side wall, all in a close fit therewith. Additionally, the lower edge has hingedly attached to it a flap for movement from a substantially planar position with respect to the plane of the center wall section, to a substantially perpendicular position to the plane of the center wall section. Additionally, the right edge has a flap hingedly attached for movement from a substantially planar position with respect to the plane of the center wall section, to a substantially perpendicular position with respect to the plane of the center wall section. Finally, the left edge has a flap hingedly attached for movement from a substantially planar position with respect to the plane of the center wall section of the bulkhead, to a substantially perpendicular position to the plane of the center wall section of the bulkhead.

The bulkhead and its parts cooperate such that when it is placed in the container with the first side of the center wall section facing the front wall, it creates a cargo space between the front wall and the first side of the center wall of the bulkhead. Additionally, each of the flaps rest against their respective side wall and the floor at less than 180° with the plane of the first side of the bulkhead's center wall section. These flaps fit against the side walls and floor in a sealed fit, and thus prevent the escape of cargo where the center wall section of the bulkhead meets the floor and side walls.

In a further embodiment of the invention, the left and right side flaps are articulated with at least one joint running down each of them, parallel to the edge of the center wall section.

In an additional embodiment of the invention, these flaps are reinforced.

In another embodiment of the invention, bracing is placed adjacent the second side of the center wall section, and detachably connected to the container to provide support for the bulkhead and to transfer the load of the cargo placed between the bulkhead and the front wall of the container.

In yet a further embodiment of the invention, the bracing is releasably connected to the bulkhead.

In still further embodiments of the invention, the bracing can be either wooden bracing, metal bars, straps, metal bands or other flexible or rigid restraining material or devices.

In yet another version of the bracing, the bracing can comprise at least one transverse bar adjacent the bulkhead's second side. The option also exists for placing the bulkhead either at some mid-point in the container and detachably connecting the bars to the side walls, or placing the bulkhead at the rear of the container and allowing the bars to rest against blocking channels located at the back of standard containers. In each of these versions, the weight of the product being transported is transferred from the bulkhead through the bars to the detachable means on the wall or to the blocking channels.

Additionally, this bulkhead can be used in containers with corrugated sides which are usually made of metal with vertical grooves spaced periodically along the interior surface. In this case, the articulated flaps of the bulkhead easily conform to the contour of the grooves to which they are adjacent. Optionally, the metal transverse bars which are releasably attached to the bulkhead can have their ends placed into the vertical grooves and provide a means for preventing the movement of the bulkhead from its position.

Additionally, the bulkhead can prevent the venting of excess dust by a diaphragm attached to the bulkhead and connected in a substantially sealed fit with the upper left and upper right side walls of the container and the ceiling of the container.

Yet other versions of the invention provide ends of inflatable tubes adjacent the respective left and right side edges of the bulkhead, abutting against the respective left and right side flaps to provide for a better sealed fit of the flap against the respective adjacent portion of the side wall. Additionally, another version of the invention provides for two separate inflatable tubes running on each edge of the bulkhead, so that when they are inflated they force the adjacent side flap against the adjacent portion of the wall.

BRIEF DESCRIPTION OF THE DRAWINGS

These and other objects, features, aspects and advantages of the present invention will be readily understood from the following detailed description, when read in conjunction with the accompanying drawings in which:

FIG. 5 is a sectional view of a top corner of a cargo container with the present invention installed;

FIG. 6 is a top perspective cut-away view of a corner of a cargo container with corrugated sides and the present invention installed;

FIG. 7 is a cross-sectional view of FIG. 4 along line I—I;

DETAILED DESCRIPTION OF PREFERRED EMBODIMENT

Figure 1:
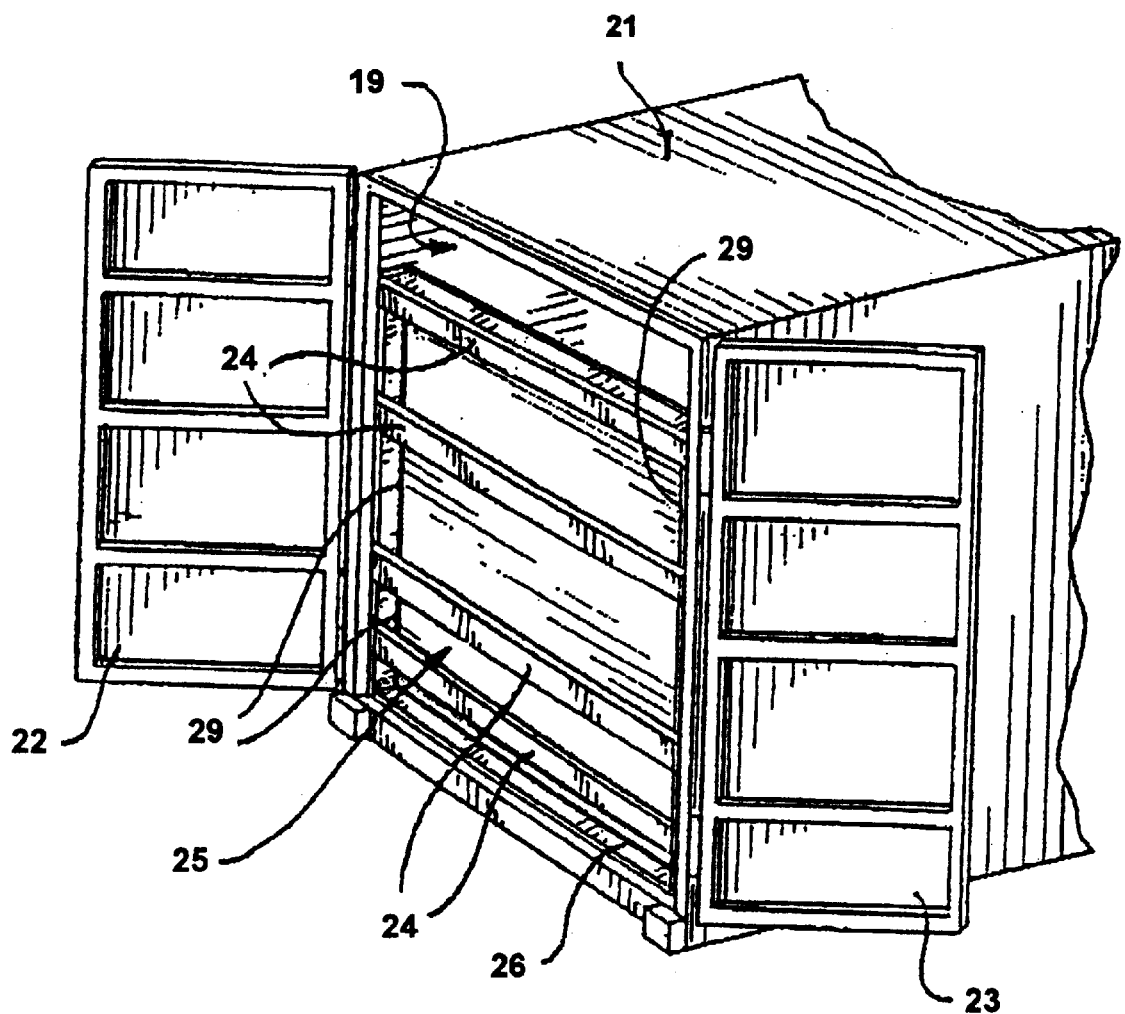
FIG. 1 is a perspective side view of a rear of a container with a prior art bulkhead.
Figure 2:
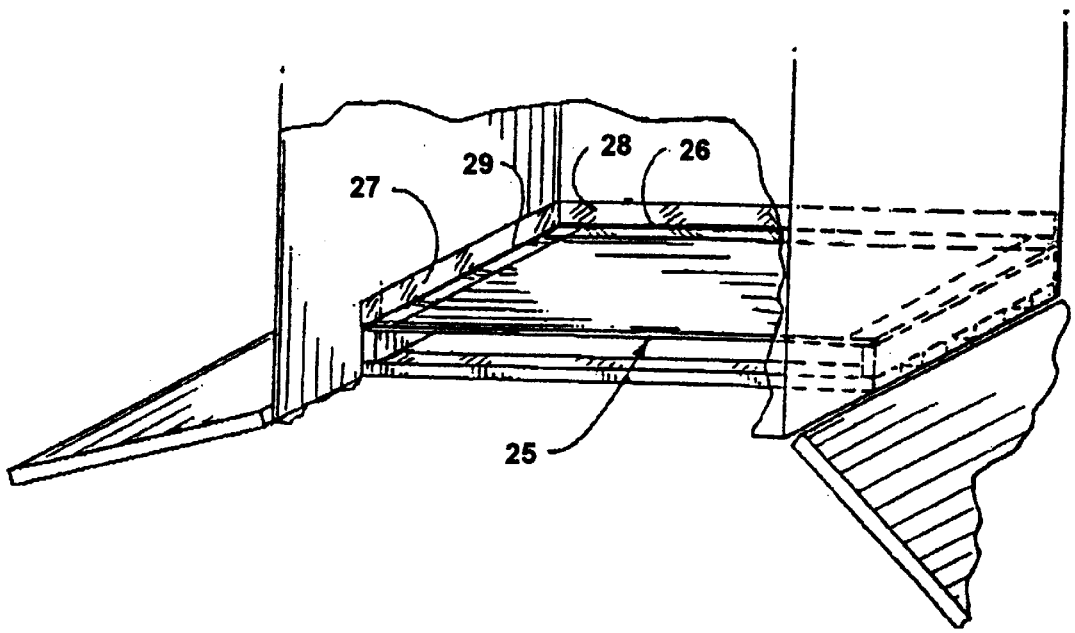
FIG. 2 is a perspective top view of the rear end of a container with the ceiling partially cut away of a prior art bulkhead.
Figure 3:
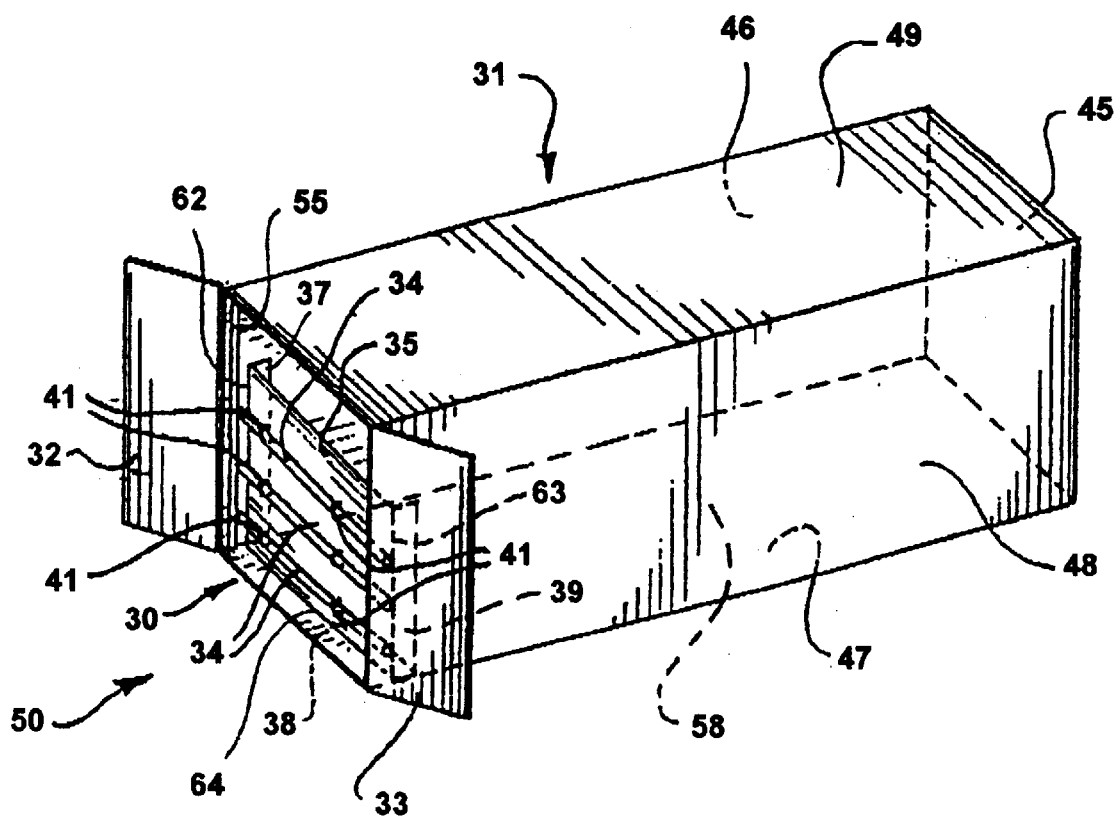
FIG. 3 is a perspective view of a cargo container with the present invention installed with bracing.

FIG. 3 depicts the preferred embodiment of the present invention. Cargo container 31, a standard ISO cargo container of anywhere from 20 to 40 feet long and generally 8 feet wide and 8 to 9 feet high, has a floor 47, a right side wall 48, a left side wall 46, a top 49, and a front wall 45. Such ISO containers are made out of aluminum, steel, or a combination of these and other materials, and have become standard in the shipping industry. The container also has a rear opening 50 with rear doors 32 and 33.

Bulkhead 30, located at the rear of the container 31, has a center wall section 35, a left side flap 37, a right side flap 39, and a lower flap 38. The bulkhead 30 of the present invention is made of a thin, light, flexible and semi-rigid material. The preferred material for making the bulkhead 30 is cardboard, in particular corrugated cardboard, with a double-walled or triple-walled thickness. Other potential materials are plastic of a sufficiently rigid but flexible construction, as well as aluminum or other similar materials. The bulkhead 30 and its center wall 35 have a generally rectangular shape so that the bulkhead's center wall section can have a close and snug fit with the floor 47 and side walls 49 and 48 of the container. The left edge 62 of the center wall 35 makes a close fit with the left side of the container 46 in FIG. 3. This is also depicted in FIGS. 5 and 6, where the left edge 62 of the center wall 35 fits in a close fit with the left side of the container. The lower edge 64, FIG. 3, of the center wall 35 fits in a close, snug fit with the floor 47 of the container. Additionally, the right edge 63, FIG. 3, of the center wall 35 fits in a close fit with the right side wall 48 of the container.

Figure 9:
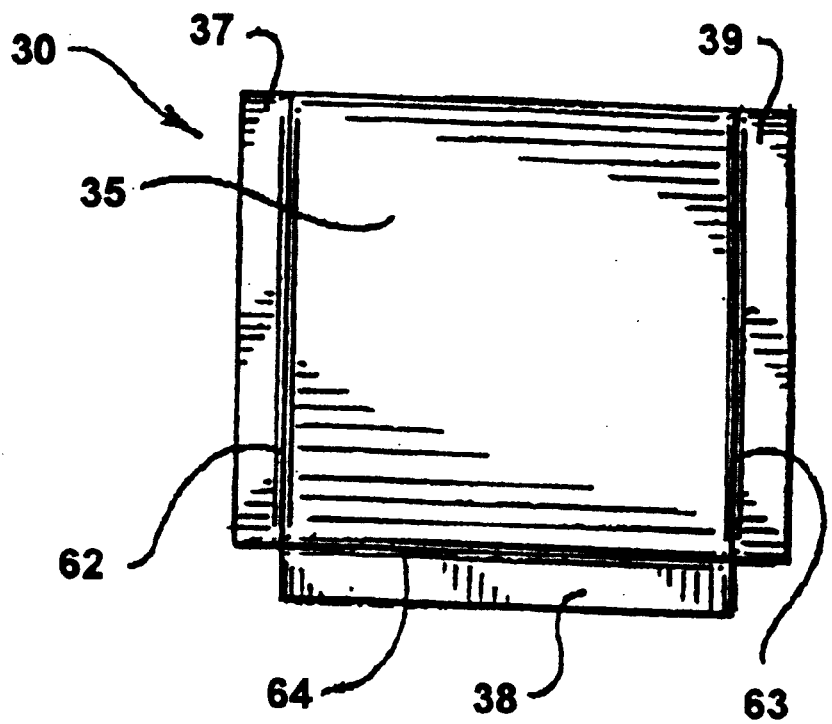
FIG. 9 is a view of the present invention with the flaps in the plane of the center wall.
Figure 10:
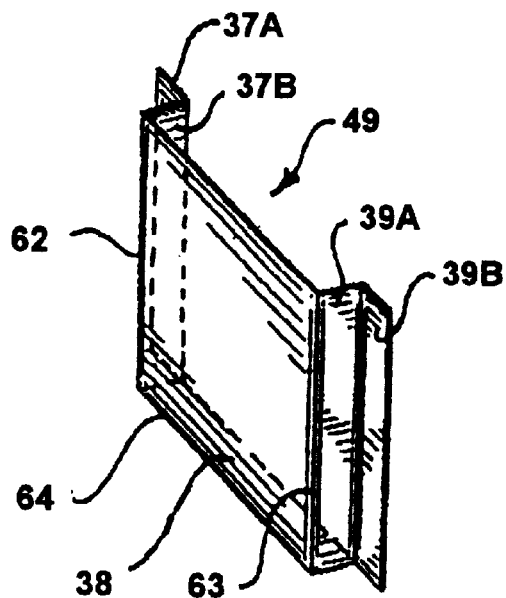
FIG. 10 is a perspective view of the present invention with articulated flaps.
Figure 11:
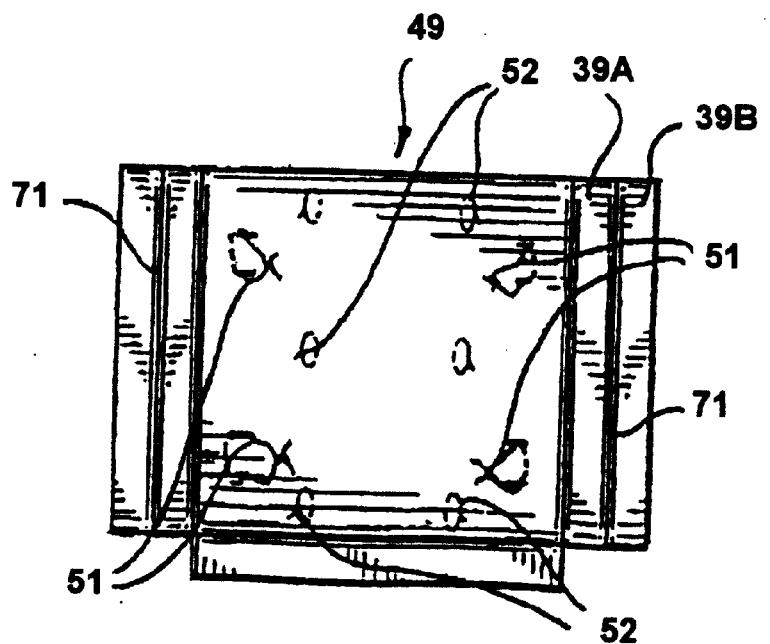
FIG. 11 is a view of another version of the present invention.

Referring to FIG. 3 and FIGS. 8 through 11, the bulkhead as noted consists of a center wall 35 and has attached to it along a left edge 62 a left flap 37, along a right edge 63 a right flap 39, and along a bottom edge 64 a bottom flap 38. On installation, the flaps 37, 38 and 39 are made to pivot and bend so that they lie flush along the sides, flap 37 against wall 46 and flap 35 against wall 48, and floor, flap 38 against floor 47, of the container. FIGS. 10 and 11 illustrate and articulated bulkhead 49 in which the side flaps 37A, 37B, 39A, 39B are articulated.

As depicted in FIGS. 3, 4, 5, 6 and 13, the flaps 37, 38 and 39, when pivoted at an angle to the center wall section 35, point toward the front wall 45 of the container. The flaps 37, 38 and 39 would then form an angle of less than 180° with a first side of the center wall section 35 which faces the front wall 45 of the container. The flaps 37, 38 and 39 in conjunction with the center wall section 35 would form a large, shallow cup to catch and retain the dry bulk, flowable cargo deposited between the bulkhead 30 and front wall 45.

As previously noted, the preferred embodiment of the bulkhead 30 would be made from a single sheet of either double-walled or triple-walled corrugated cardboard. Thus, the flaps 37, 38 and 39 would in fact form an integral part of the bulkhead, and the edges 62, 63 and 64 would be created by making creases at the juncture of the flap sections and the center wall. See FIGS. 8, 9, 10 and 11. A specially-made die, the manufacture of which can be easily done by those knowledgeable in the cardboard fabrication industry, would cut the sheet of cardboard into the appropriate shape, as depicted in FIG. 9 for form bulkhead 30. Then, creases would be made along lines 62, 63 and 64 to allow the flaps 37, 38 and 39 to freely pivot along these crease lines for hinged movement away from and into the plane of the center wall 35.

Erecting the bulkhead 30 in the container 31 defines the cargo space 58 between the bulkhead 30 and front wall 45. Many types of dry bulk, flowable cargos can be carried in this cargo space 58. Quite often hops, rice, malt and other types of agricultural products are carried. Additionally, recycled plastic, polypropylene, polyethylene and other types of materials in a powderized or pelletized can be carried therein. Generally, most of these cargos would create enough force against the bulkhead to require additional bracing. Therefore, in the preferred embodiment, transverse bracing bars 34, FIGS. 3 and 13, would be placed between the bulkhead 30 and the rear opening 50 of the cargo container to hold the bulkhead in place. The bars would extend horizontally across the bulkhead and would be detachably connected to the left and right side walls of the container. The connection could be into brackets placed on the container walls 83, FIG. 13. However, in the preferred embodiment, generally the bars would be releasably connected to the rear side of the bulkhead by cable ties 41. Additionally, the ends of the bars 34 would fit generally into blocking channels 55 or abut against blocking channels 55 at the rear of the container.

Figure 17:
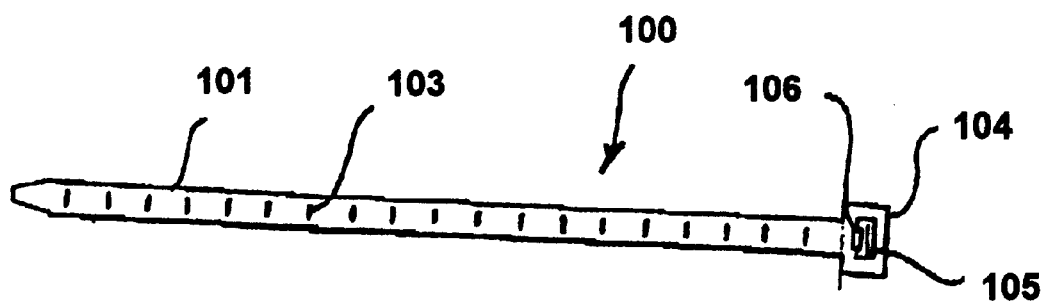
FIG. 17 provides one view of a common cable tie.
Figure 18:
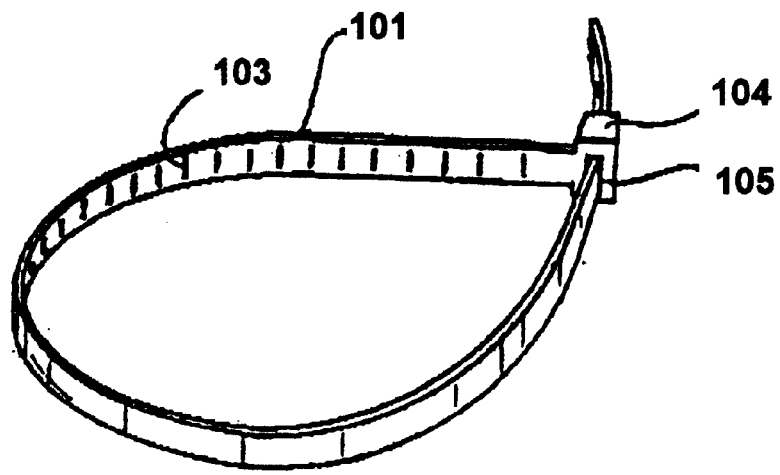
FIG. 18 provides another view of a common cable tie closed on itself.
Figure 19:
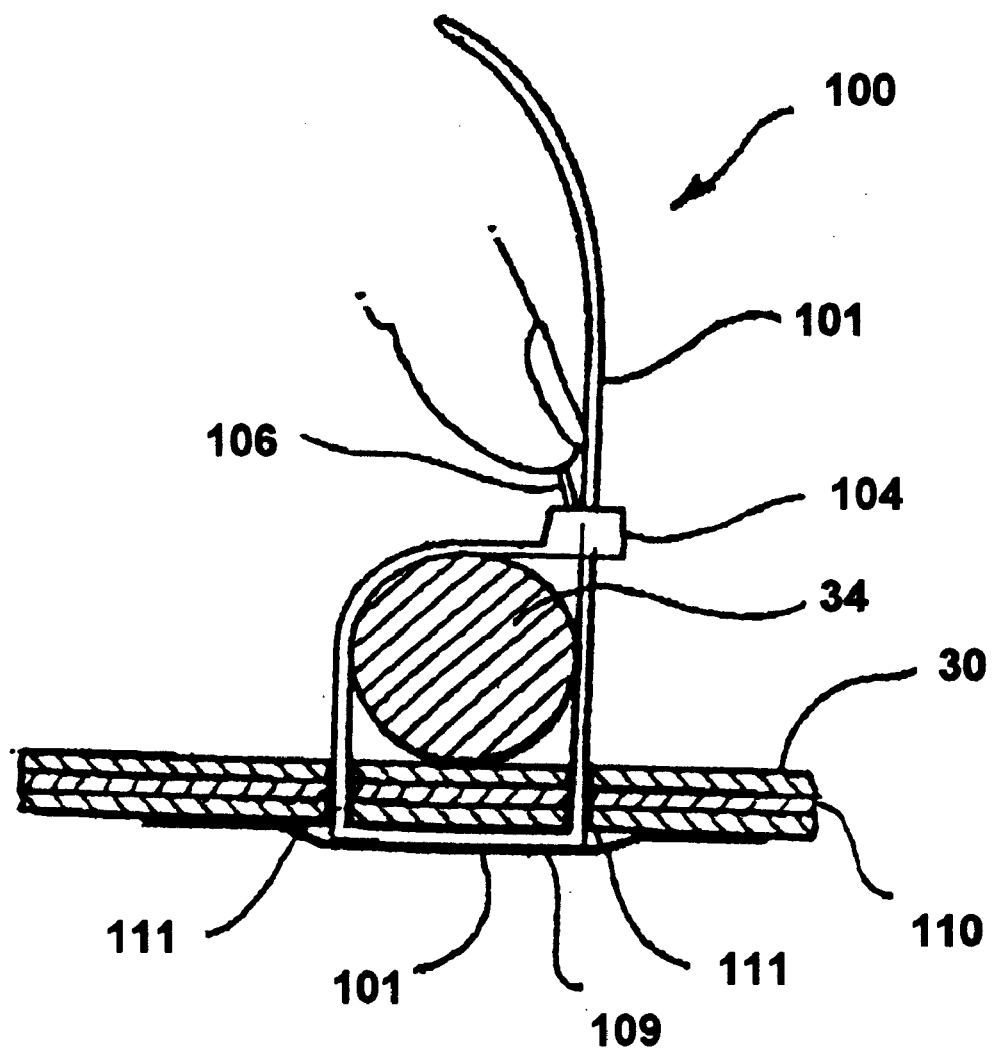
FIG. 19 provides a cross-sectional view of a portion of a bulkhead with the cable tie releasably installed.

FIGS. 17, 18 and 19 depict the preferred type of cable tie which one would use in practicing the current invention. FIG. 17 depicts a cable tie 100 commonly available in the industry. One such available cable tie is made by the Panduit Corporation under the trademark Pan-Ty®. This cable tie has a tail 101 with ratchet points 103. Generally, it is made of plastic, and it has a head 104 with an opening 105 through which the tail 101 would be inserted. The cable tie also has a release mechanism 106 which, when depressed as illustrated in FIG. 19, allows for the removal of the tail 101 from the head 104. Thus, a flange located in opening 105 would catch the ratchet points 103 and grip the tail 101 until release 106 is depressed. FIG. 19 also depicts the cable tie in use with the present invention, in which it is releasably holding the metal bar 34 against a first side of the bulkhead 30. Bulkhead 30 is a double-corrugated 110 cardboard sheet. Additionally, over a second side of the bulkhead 30, a piece of tape 109, or other type of appropriate material, has been attached to seal off the holes 111 through which the tail 101 and head 104 of the cable tie would have to be inserted. Those familiar with the art can easily see that other alternatives are available besides these cable ties. Common wire, which is easily malleable and twistable onto itself, could be used. String or rope could also be used. Additionally, other similar types of devices to releasably connect the bars to the bulkhead are available.

Thus, when a cargo is placed in a container after proper installation of the bulkhead 30 of the present invention, the force of the cargo presses against the center wall 35 of the bulkhead, and also presses against the left side flap 37, the bottom flap 38, and right side flap 39. This pressure from the cargo forces each of the flaps 37, 38 and 39 into a flush fit against the sides and floor of the container to which they are adjacent. FIG. 5 presents a sectional overhead view of the bulkhead installed with a cargo resting against it. As depicted, the cargo forces the left side flap 37 depicted therein against the left side wall 46. The force of the cargo is also transmitted from the bulkhead center wall 35 to the metal bars 34, which in turn transmit it to the flange or lip 55 which forms the blocking channel. FIGS. 3 and 5, as well as most of the other figures, depict cargo containers with generally planar, flat side walls. These cargo containers are made of aluminum or steel, or a combination. Additionally, sometimes the interior walls of the container are lined with sheets of plywood. However, another side wall structure used in the industry involves a corrugated wall made of aluminum, or a similar type of durable, light-weight metal. FIG. 6 depicts a sectional overview of part of a corrugated side wall 46A in which the present invention is also installed. If the bulkhead of the present invention were placed in a container with corrugated sides, there might be a tendency for the product to seep in between the flap 37 and indentation or groove 87, if the flap is not sufficiently yieldable. If the products collects between the flap 37 and in the space 37B created by the corrugated grooves 87, the flap may be pushed away from the wall 46 against the center wall 35 of the bulkhead. If this happened, the necessary seal between the bulkhead flap 37 and wall would fail, and the product may thereby leak out. However, to avoid this problem, the flaps in the preferred embodiment are articulated. A series of one or more joints 71 FIG. 11 are created to achieve articulation of the flap. The joints 71 on the flap generally run parallel to the adjacent edge of the center wall 35 of the bulkhead. Joints can be created in corrugated cardboard by either a crush or score crease. If a score crease is used, then reinforcement of the joints 71 is required with some type of appropriate tape. Articulation of the left and right side flaps allows the flaps to easily bend and conform to the contour of the vertical grooves 87 in the corrugated sides 37A, as depicted in FIG. 6. In FIG. 6, the left side flap 37 bends at joint 71, allowing section 37A to bend and conform to the contour of the corrugated grooves.

Figure 13:
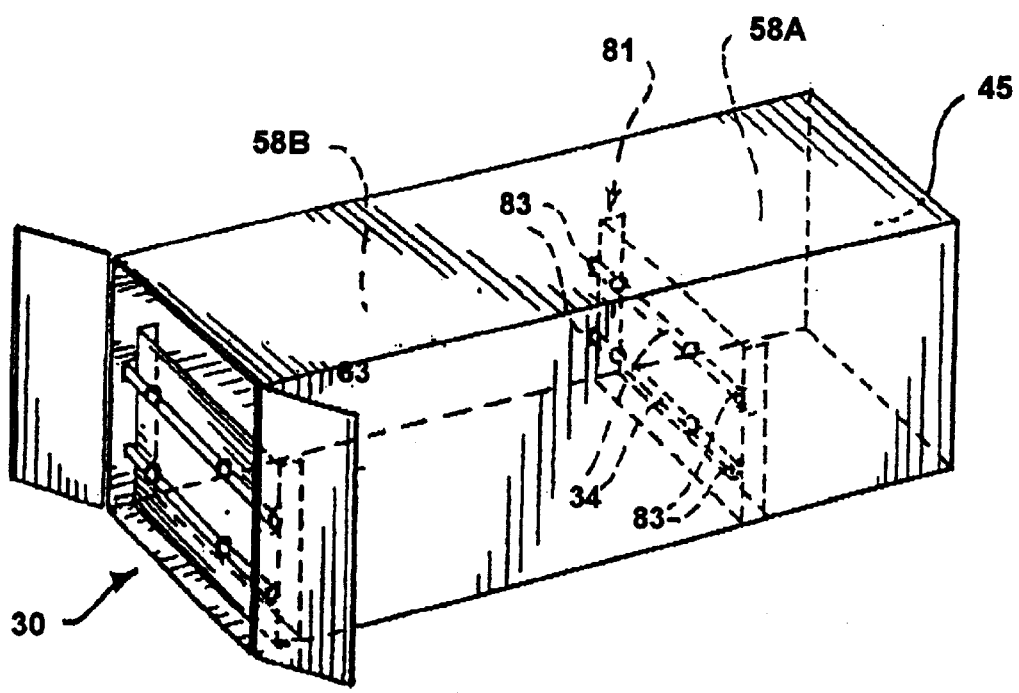
FIG. 13 is a perspective view of a cargo container with two versions of the present invention installed.

The bulkhead does not have to be installed at the rear opening 50 of the container. It can be installed at another position, as depicted in FIG. 13, by bulkhead 81. In this case, the metal bars 34 fit into receptacles 83 specifically placed for this purpose by the installer on the sides of the container. In fact, this type of modular construction allows one to create two separate storage spaces as depicted in FIG. 13, the storage spaces being storage space 58A between the front wall of the container 45 and bulkhead 81, and storage space 58B between bulkhead 81 and bulkhead 30 at the rear of the container.

Figure 14:
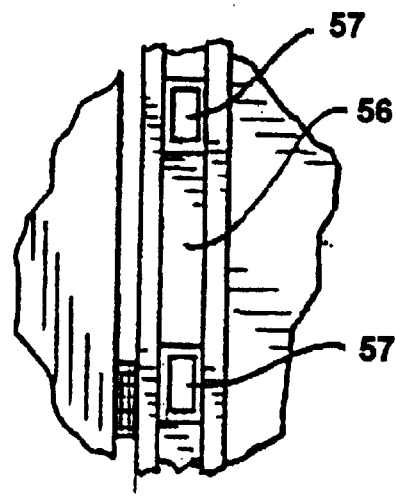
FIG. 14 is a sectional view of the rear inside section of the back opening.
Figure 15:
FIG. 15 depicts a retractable bracing bar.
Figure 16:
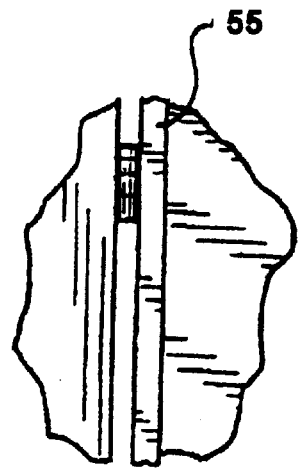
FIG. 16 is a sectional view of a cargo container.

Although in the preferred embodiment, one would releasably connect the metal bars to the bulkhead, there are options for avoiding this. On some containers in the blocking channel 56, as depicted in FIG. 14, recessed spaces 57 exist. Thus, one is able to take a retractable metal bar 36, which has a male bar 34A which is retractably inserted into a female bar 34B to allow the bar to be extended as needed, well-known to those skilled in the art, as depicted in FIG. 15, and extend it so that it fits into the receiving recess 57 located at the rear on the opposite side of the container. Thus, the bulkhead can be placed adjacent to the metal bar which have been so installed.

Figure 4:
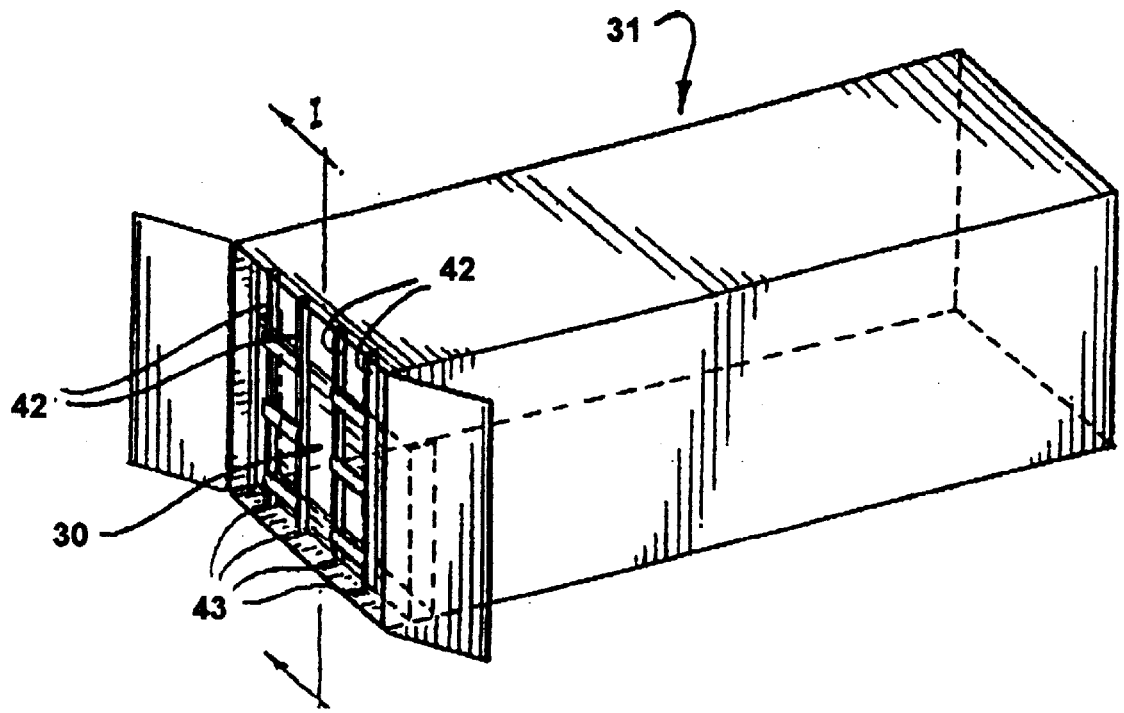
FIG. 4 is a perspective view of a cargo container with the present invention installed with alternate bracing.

When it is necessary to brace the bulkhead 30 in the container, other options exist. Vertical bracing, as depicted in FIG. 4, can be used. Generally, metal or wooden beams can be used to brace the bulkhead. However, in the preferred embodiment of this form of bracing, wooden bracing is the most commonly used. This type of bracing is commonly known in the industry. Generally, the wooden or metal beam 42 would be placed at the rear of the container with a retaining bracket 43 screwed or nailed to the floor to hold the foot of the beam 42, the top of the beam fitting against flange at the roof 47 of the container, with bulkhead 30 adjacent it.

Figure 8:
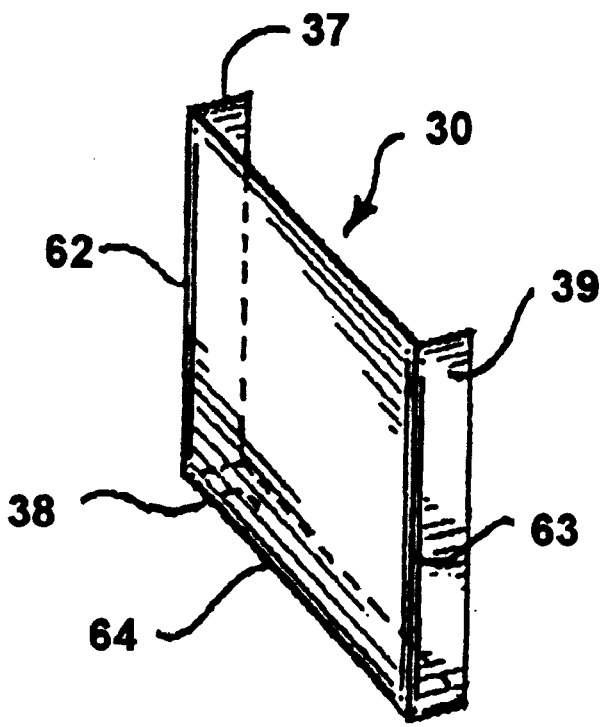
FIG. 8 is a perspective view of a bulkhead of the present invention with the flaps at 90° to the center wall of the bulkhead.
Figure 8A:
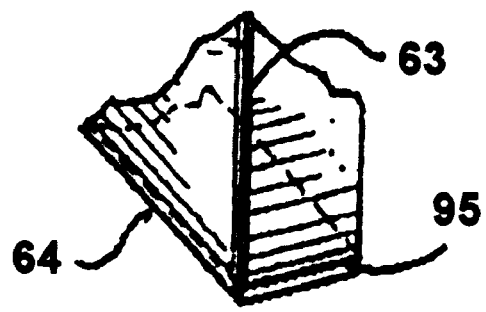
FIG. 8A is a sectional view of the lower corner of a bulkhead of the present invention in a deployed position.
Figure 9A:
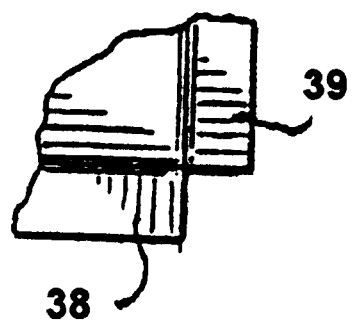
FIG. 9A is a cutaway view of the bulkhead showing the absence of a gap between the adjacent corners of the lower flap and the side flap.

Referring to FIGS. 8 through 12, as previously noted, the preferred embodiment of the bulkhead is made up of a single sheet of corrugated cardboard of sufficient thickness which is cut to the appropriate shape 30, FIG. 9. Then, appropriate score or crush creases are made to form the joints for the flaps with respect to the center wall. As noted in FIG. 9A, the flaps and creases, when made in the cardboard, are cut such that there is no gap between the adjacent corners of the lower flap 38 and the side flap 39. The reason for this is that once bent or pivoted into position, the flaps must form a perfect fit, as depicted in FIG. 8a, wherein no gap between the flaps exists at juncture 95 in FIG. 8a. This construction effectively seals each lower corner and prevents the loss of product.

Figure 12:
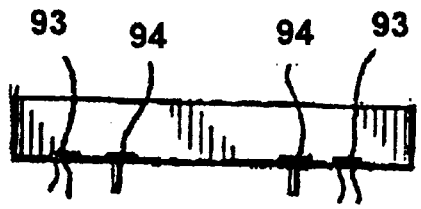
FIG. 12 is a view of the top of a bulkhead of the present invention in a deployed configuration.

Additionally, to facilitate installation, handles of tape or cord 51, FIG. 11, are provided on the bulkhead. Also, the cable ties 52 are pre-attached, as indicated in FIG. 11, so that upon placement of the metal bars, they can be easily made to secure the metal bars releasably to the bulkhead. Additionally, to prevent any leakage of product, when the handles and cable ties are attached through the bulkhead, as depicted in FIG. 12, from the first side of the bulkhead which would face in toward the cargo, to the second side which would face out toward the opening in the bars, tape 93 and 94 would be placed at the position where the handles and cable ties are inserted through the bulkhead. This would effectively seal any holes around these regions, prevent leakage of the product, and additionally strengthen the bulkhead.

Figure 20:
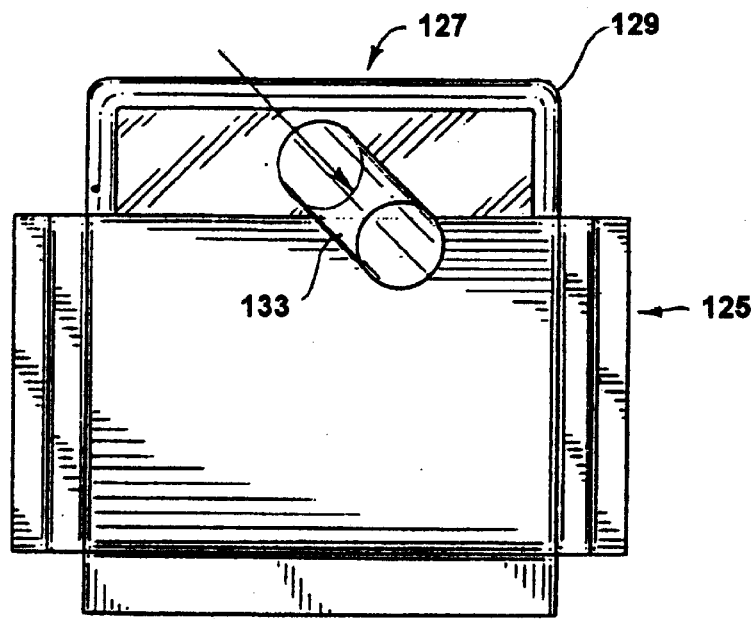
FIG. 20 provides a front view of a bulkhead with attached diaphragm.
Figure 21:
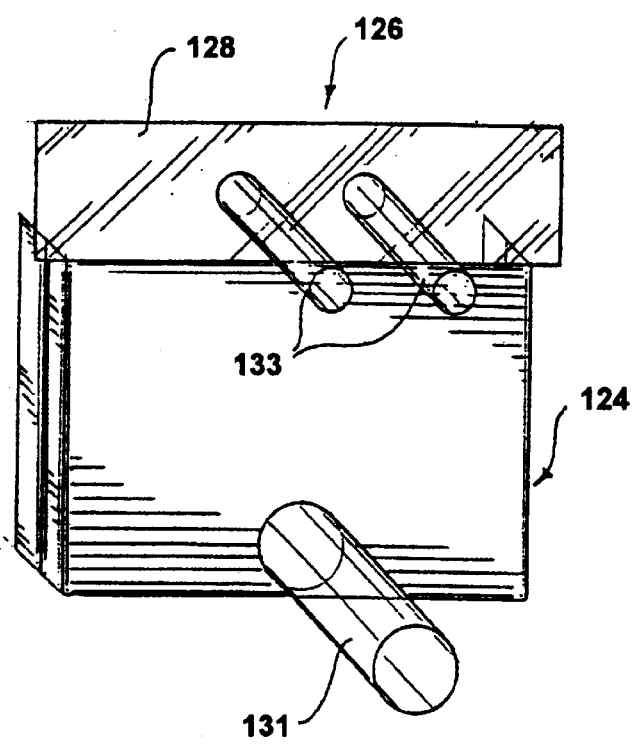
FIG. 21 provides a perspective view of one version of the bulkhead with a diaphragm.
Figure 22:
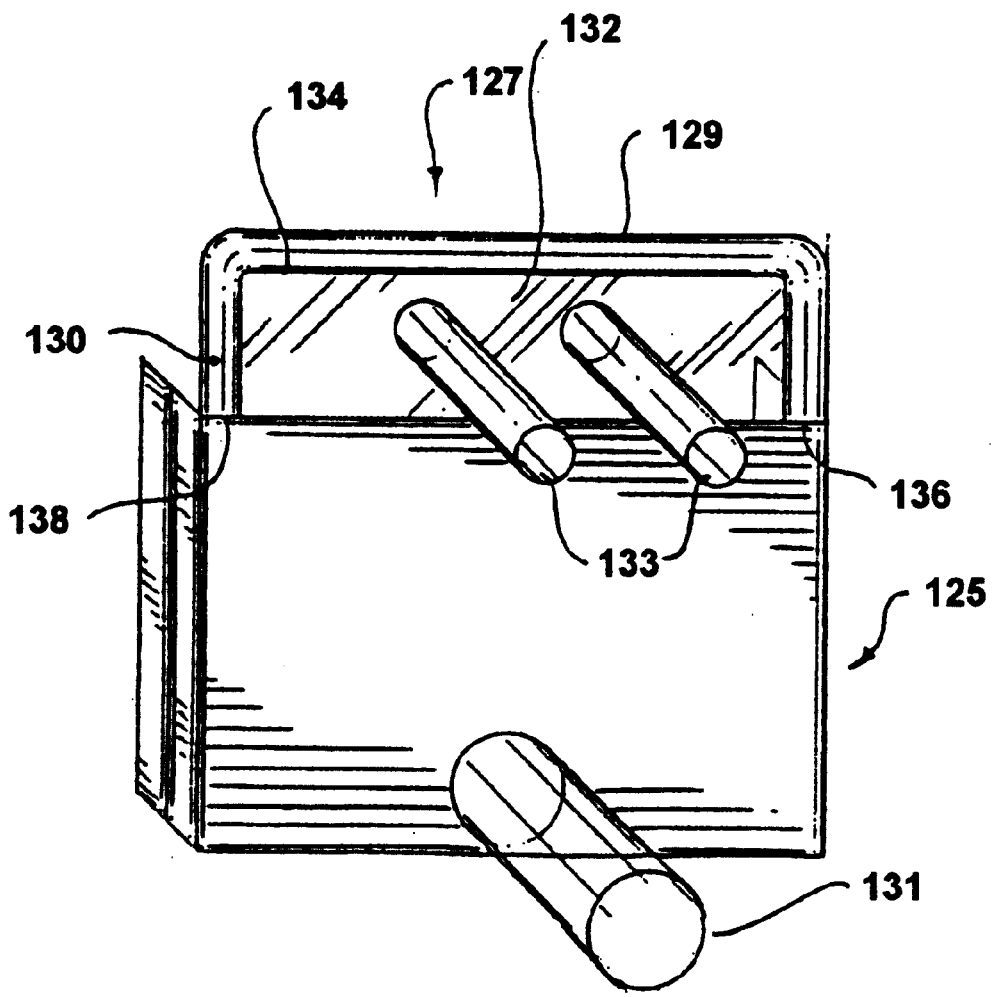
FIG. 22 provides a perspective view of another version of the bulkhead with a diaphragm.

When using the above-described bulkhead or even the prior art bulkheads as previously described, a significant generation of dust during loading arises. This dust has a tendency to vent out the opening between the top of the bulkhead and the ceiling of the container. One solution to this problem is to place a shroud over this opening. FIG. 20 depicts a bulkhead with a shroud or a diaphragm attached to close off the opening 17, FIG. 3. The invention consists basically of the bulkhead, as previously described, and the diaphragm 127. FIGS. 21 and 22 depict two different versions of the shroud or diaphragm. FIG. 21 depicts the shroud made up of a sheet of highly flexible but strong material, such as polypropylene or polyethylene. Once the bulkhead is installed in the container, the diaphragm or shroud 126 is then attached to the adjacent top left and right side walls of the container, as well as to the ceiling. Tape, adhesive or other suitable material could be used to attach the diaphragm 126 along its edge 128 to the adjacent upper left and upper right side walls as well as to the ceiling of the container. A conventional discharge port 131, well known in the art, is also shown.

Figure 23:
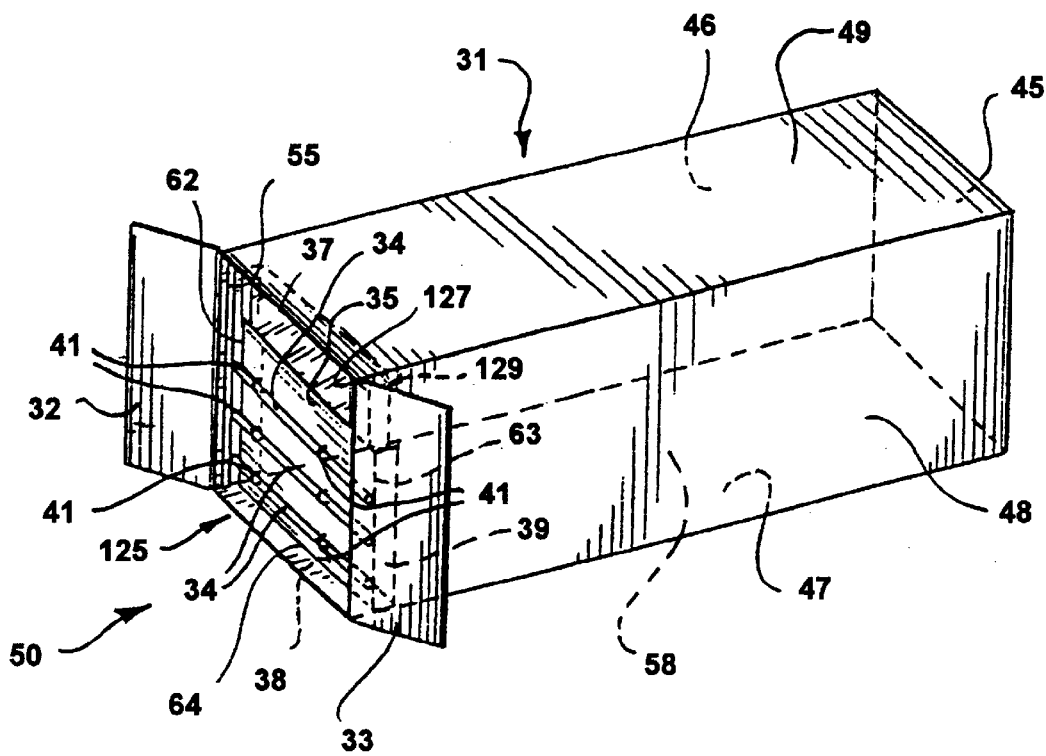
FIG. 23 provides a perspective view of the container with bulkhead and attached diaphragm installed in the container.
Figure 24:
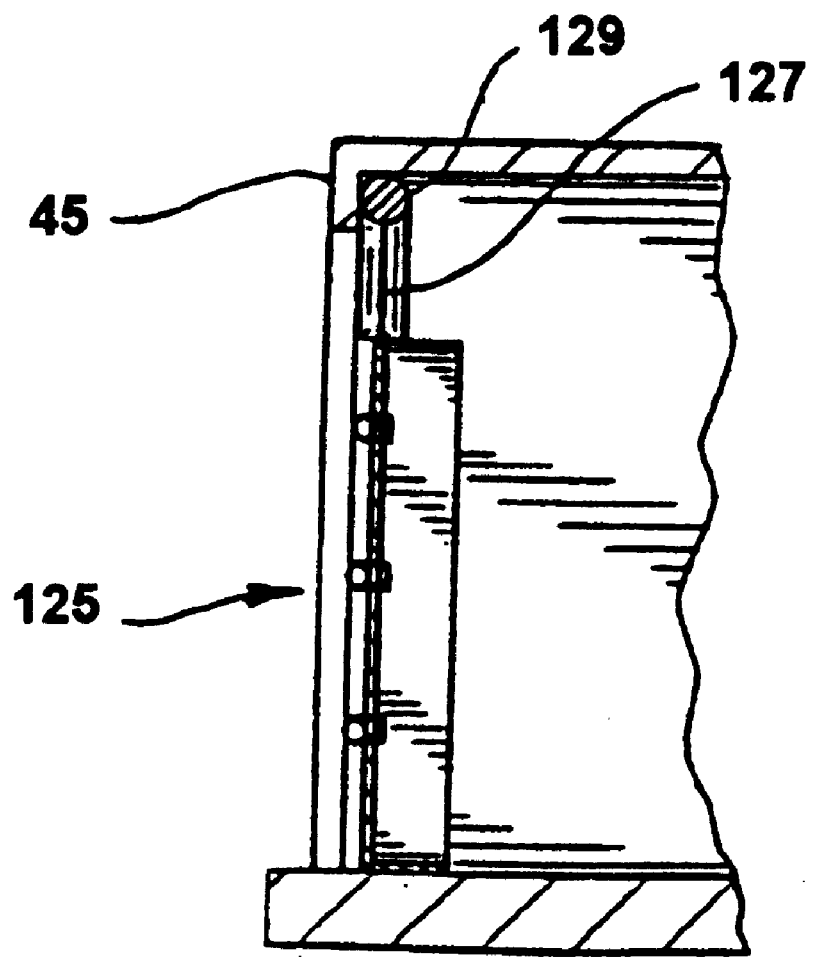
FIG. 24 provides a cross-sectional view of FIG. 22 depicting the bulkhead and diaphragm erected in a container.

FIG. 22 depicts another version of the bulkhead with diaphragm 127. In this instance, the diaphragm 127 is made up of a thin, highly flexible and resilient material 132. Such material would be polypropylene or polyethylene. Around the periphery 134 of this material, a flexible and inflatable tube 129 is attached. Once the bulkhead is erected in the container, air is injected into the tube 129, which at the time is flat, through valve 130. Injection of the air into the tube which is closed at both ends 136 and 138 causes the tubes to become erect and rigid, and draws sheet 132 taut. FIG. 23 depicts the bulkhead 125 erected in the container with the diaphragm 127 drawn taut by tube 129 which has been filled with air. In FIG. 24, a cross-sectional view of the installed bulkhead 125, the diaphragm 127 has been drawn taut by tube 129 which is filled with air. As can be seen, once tube 129 is filled with air, it reaches up and comes into contact with the container, specifically with the top lip 45 of the container. Thus, the bulkhead and diaphragm create a relatively sealed space 58 in the container. The cargo can then be loaded through one of the loading/venting spouts 133. FIGS. 21 and 22 depict a bulkhead and diaphragm with two loading/venting spouts 133. One of the loading/venting spouts is used for the blowing in of the dry bulk, flowable cargo. The other spout would be used to vent excess air or dust in the container and to allow for equalization of pressure. Naturally, a filter sock or some other device to catch the excess dust and air coming out would be attached to the venting spout. Additionally, for unloading, spout 133 would be unfurled and used when the container is unloaded in the fashion well-known by those skilled in the art.

Thus, it can be seen that the bulkhead with diaphragm, as depicted in FIGS. 21 through 24, provides for the sealing of the cargo space in the container to prevent the excess venting of dust into the atmosphere surrounding the trailer. This device enables the catching and collecting of any dust or excess air coming out through the venting spouts 133, thus preventing the contamination and pollution of the surrounding environment.

Figure 25:
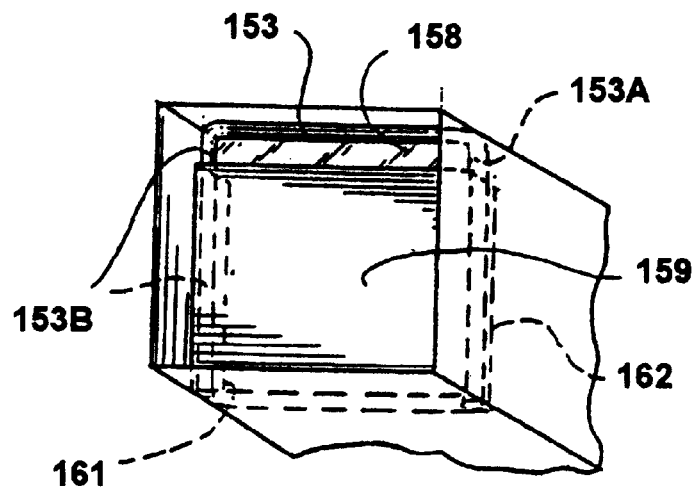
FIG. 25 depicts a perspective view of another variation of the invention.

FIG. 25 shows yet another embodiment of the prospective invention. Therein the bulkhead 159 has right side flap 162 and left side flap 161. Additionally, the diaphragm 158 appears therein also. Finally, the inflatable tube 153 extends from a first end 153B on the left side adjacent the left side flap 161 to a second end 153A on the right side adjacent the right side flap 162. One of the advantages of this construction is that the tube, when inflated, forces the respective adjacent side flap against the side wall, and provides for a better sealed fit.

Figure 26:
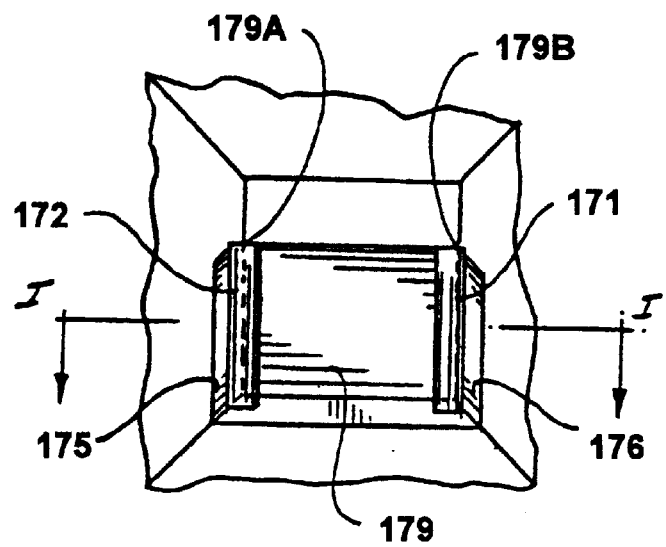
FIG. 26 provides an elevated view of another version of the prospective invention.

In yet another variation of the invention, two separate tubes are used. FIG. 26 depicts a bulkhead 179 with a left side flap 175 and a right side flap 176. Therein adjacent on the left edge of the bulkhead 179A, inflatable tube 172 is adjacent the left side flap, and at the right edge of the bulkhead 179B, inflatable tube 171 is adjacent the right side flap. These tubes, when inflated, would force the respective side flap against the adjacent portion of the container wall and provide for a better sealed fit.

Figure 27:
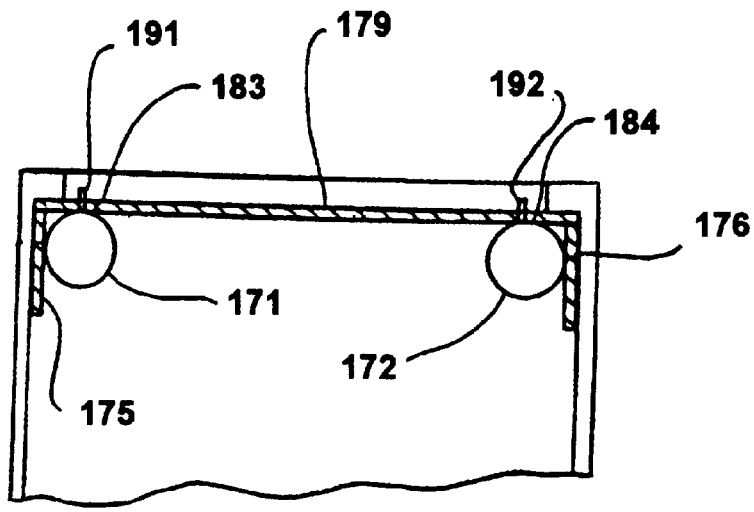
FIG. 27 is a top view of the bulkhead of FIG. 26 showing the inflatable tubes holding the side flaps against the walls of the container.

FIG. 27 is a top plan view of the embodiment of FIG. 26. Inflatable tubes 171, 172 are shown in the inflated configuration in which they press against side flaps 175, 176, and are attached to central wall 179 at points 183, 184 respectively. When inflated, they press the side flaps 175, 176 against the side walls of the container for a more secure seal. Inflatable tubes 171, 172 are inflated via inflation lines 191, 192, respectively. Inflation lines 191, 192 are inserted through central wall 179 to allow inflation from outside of the container.

Figure 28:
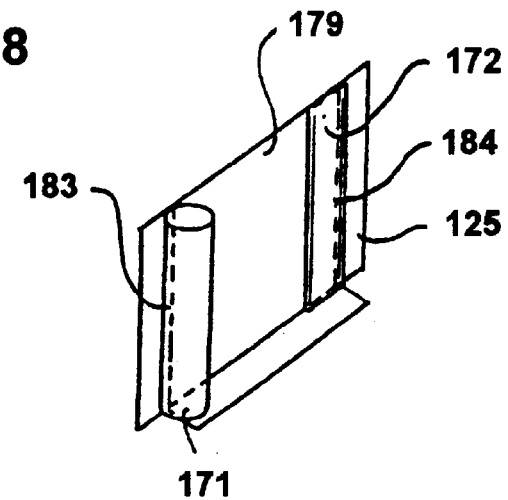
FIG. 28 is a perspective view of the bulkhead of FIG. 26 showing one of the inflatable tubes inflated and the other inflatable tube deflated for storage.

FIG. 28 is a perspective view of the embodiments of FIGS. 26 and 27 which illustrates one inflatable tube 171 in the inflated position and the other inflatable tube 172 in the deflated position.

Finally, obviously, with respect to the version of the invention depicted in FIG. 25, the diaphragm 158 could be removed, and the invention as practiced would still provide for a better sealing of the side flaps against the adjacent portion of the sidewall.

Although the description of the preferred embodiment describes use of the bulkhead of the present invention with standard ISO containers, those skilled in the art will readily see that this invention can be used just as easily with standard semi-trailers used for over-the-road transport. The interior of a standard semi-trailer has many of the same characteristics as an ISO container.

While it is apparent that the invention herein disclosed is well calculated to fulfill the objectives previously stated, it will be appreciated that numerous modifications and embodiments may be devised by those skilled in the art, and it is intended that the appended claims cover all such modifications and embodiments that fall within the true spirit and scope of the present invention.

I claim:

1. A moveable semi-rigid bulkhead for retaining a cargo inside a cargo container, the container having a floor, left and right side walls, and a front wall and a rear opening, the bulkhead comprising:

a central wall member adapted to rest on the floor of the cargo container in a close fit with the floor and side walls thereof;

said central wall member having a first side and a second side, to form a thin flexible but semirigid substantially planar sheet with a substantially rectangular shape having four edges, said four edges including a lower edge adapted to rest on the floor, a right edge adapted to rest against the right side wall and a left edge adapted to rest against the left side wall and a top edge;

said lower edge having a flap hingedly attached for movement from a substantially planar position with respect to the plane of the central wall member to a substantially perpendicular position to the plane of the central wall member;

said right edge having a flap hingedly attached for movement from a substantially planar position with respect to the plane of the central wall member to a substantially perpendicular position to the plane of the central wall member;

said left edge having a flap hingedly attached for movement from a substantially planar position with respect to the plane of the central wall member to a substantially perpendicular position to the plane of the central wall member;

the central wall member and the lower edge flap, right edge flap and the left edge flap cooperate such that, when placed in a container with the first side of the central wall member facing towards the front wall of the container to create a cargo space therebetween, said right edge flap rests in a substantially sealed fit against the right side wall of the container at an angle of less than 180 degrees with a plane of said first side of said central wall member, said left edge flap rests in a substantially sealed fit against the left side wall of the container at an angle of less than 180 degrees with a plane of said first side of said central wall member, said lower edge flap rests in a substantially sealed fit against the floor of the container at an angle of less than 180 degrees with a plane of said first side of said central wall member, the lower edge flap, the right edge flap, and the left flap articulated such that, when installed in a container, they form a substantially leak proof seal between the lower edge flap and the right edge flap and a substantially leak proof seal between the lower edge flap and the left edge flap, wherein said bulkhead creates a barrier to retain cargo placed between said bulkhead and the front wall of the container; and bracing means adjacent to the second side of the central wall member, and releasably connected to the container to provide support for the bulkhead and transfer the load of a cargo placed between the bulkhead and front wall from the bulkhead to the container.

2. The bulkhead of claim 1, wherein the left flap comprises an articulated flap with at least one joint running down its length approximately parallel to the left edge of the central wall member and the right flap comprises an articulated flap with at least one joint running down its length approximately parallel to the right edge of the central wall member.

3. The bulkhead of claim 2, wherein the at least one joint of the left flap and the at least one joint of the right flap are reinforced for durability.

4. The bulkhead of claim 1, wherein the container has a top, and the bracing means comprises vertical bracing running from the top of the container to the floor of the container and detachably connected at the top of the container and the floor of the container.

5. The bulkhead of claim 4, wherein the bracing means is releasably connected to the bulkhead.

6. The bulkhead of claim 4, wherein the bracing means comprises wooden bracing.

7. The bulkhead of claim 4, wherein the bracing means comprises metal bars.

8. The bulkhead of claim 3, wherein the bracing means comprises at least one transverse bar adjacent to the bulkhead's second side, said at least one bar having its first end detachably connected to the right side wall of the container, and a second end detachably connected to the left side of the container.

9. The bulkhead of claim 8, wherein the at least one transverse bar is releasably connected to the bulkhead.

10. The bulkhead of claim 9, wherein the bulkhead is placed on the floor of the container adjacent the rear opening, and the detachably connected first end of the at least one bar comprises the first end of the at least one bar resting in a blocking channel on the left side of the container, and the detachably connected second end of the at least one bar comprises the second end of the at least one bar resting in a blocking channel on the right side of the container.

11. The bulkhead of claim 2, wherein the left and right side of the container are corrugated with vertical grooves spaced periodically along the interior surface, and the articulated flaps conform to the contour of a groove to which they are adjacent.

12. The bulkhead of claim 9, wherein the left side and right side of the container are corrugated with vertical grooves spaced periodically along the interior surface, and detachably connecting the first end of the bar comprises inserting it into a vertical groove on the left side of the container, and detachably connecting the second end of the bar to the right side of the container comprises inserting it into a vertical groove on the right side of the container.

13. The bulkhead of claim 8, wherein the detachably connected first and second ends of the at least one bar comprise the connection of the first end of the bar to a bracket on the left side wall of the container and the connection of the second end of the bar to a bracket on the right side wall of the container.

14. The bulkhead of claim 9, wherein the releasably connected at least one bar comprises at least one cable tie connecting it to the bulkhead.

15. The bulkhead of claim 1 further comprising a diaphragm attached to the bulkhead and connected in a substantially sealed fit with the upper portion of the left side wall, the upper portion of the right side wall, and the ceiling of the container, such that the diaphragm, the bulkhead and the container cooperates to create a sealed cargo space in the container.

16. The bulkhead of claim 15 in which the diaphragm has an inflatable tube which forms an unattached edge of the diaphragm, which tube, when inflated, causes the diaphragm to come into contact with the ceiling and an upper portion of the right side wall and an upper portion of the left side wall of the container to create the sealed cargo space with the bulkhead and container.

17. The bulkhead of claim 15 with a conduit through the bulkhead for access to and from the sealed cargo space.

18. The bulkhead of claim 15 with a conduit through the diaphragm for access to and from the sealed cargo space.

19. The bulkhead of claim 16, wherein the inflatable tube has a first end which extends down a right edge of the bulkhead toward the floor, and the inflatable tube has a second end which extends down a left edge of the bulkhead toward the floor.

20. The bulkhead of claim 19, wherein the first end which extends toward the floor abuts against the right side flap, and the second and which extends toward the floor abuts against the left side flap, so that the first end keeps the right side flap in contact with an adjacent portion of the right side wall, and the second end keeps the left side flap in contact with an adjacent portion of the left side wall.

21. The bulkhead of claim 1, further comprising an inflatable tube with a first end that extends down the right edge of the bulkhead, and a second end of the inflatable tube that extends down the left edge of the bulkhead.

22. The bulkhead of claim 21, wherein the first end of the inflatable tube which extends toward the floor abuts against the right side flap, and the second end as it extends toward the floor abuts against the left side flap, so that the first end keeps the right side flap in contact with an adjacent portion of the right side wall, and the second keeps the left side flap in contact with an adjacent portion of the left side wall.

23. The bulkhead of claim 1, further comprising an inflatable tube which extends down a right edge of the bulkhead, and a second inflatable tube which extends down a left edge of the bulkhead.

24. The bulkhead of claim 23, wherein the first tube abuts against the right side flap, and the second tube abuts against the left side flap, so that the first tube keeps the right side flap in contact with an adjacent portion of the right side wall, and the second tube keeps the left side flap in contact with an adjacent portion of the left side wall.

\* \* \* \* \*